Aug. 21, 1956     W. M. HOULDSWORTH     2,759,438
DEVICE FOR TRIMMING, CRIMPING AND MARKING PIE CRUSTS
Filed Dec. 26, 1950
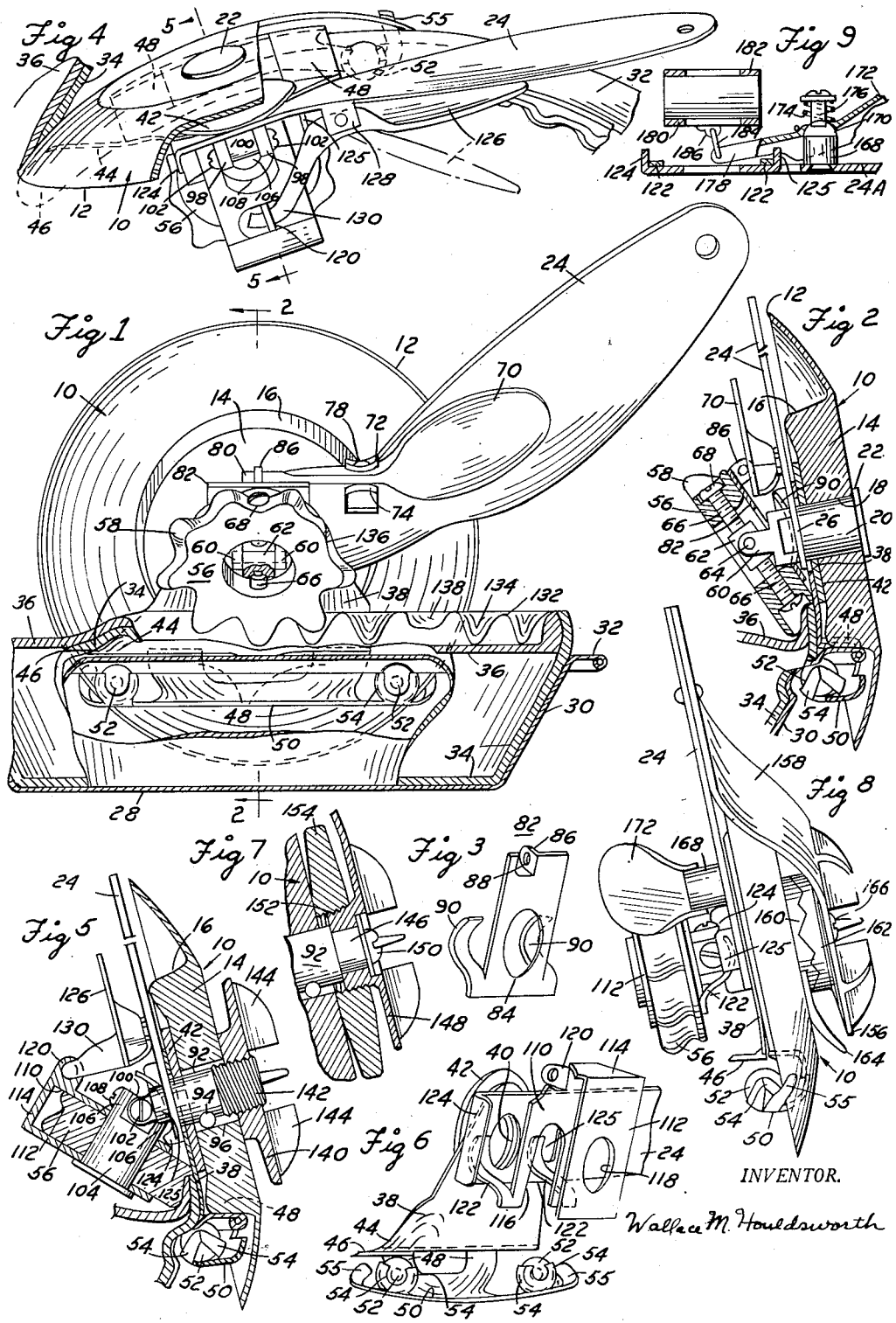
INVENTOR.
Wallace M. Houldsworth

United States Patent Office 2,759,438
Patented Aug. 21, 1956

2,759,438

DEVICE FOR TRIMMING, CRIMPING AND MARKING PIE CRUSTS

Wallace M. Houldsworth, Royal Oak, Mich.

Application December 26, 1950, Serial No. 202,644

7 Claims. (Cl. 107—49)

This invention relates to devices for assisting in the making of pies and the like and particularly to a device for trimming, crimping and marking the crusts of pies. This invention relates to improvements in the devices for the same purposes described and illustrated in my co-pending applications for United States patents, Serial No. 130,949, filed December 3, 1949, now Patent No. 2,700,348, dated January 25, 1955 and Serial No. 183,227 filed September 5, 1950, now Patent No. 2,701,534, dated February 8, 1955.

An important object of the present invention is to provide an improved kitchen utensil for trimming and crimping crusts of pies and the like which is adapted to travel around the rim of a pie pan or similar container and while so doing sever the excess amount of crust material, crimp the remaining edge of the crust, free the edge of the crust from the pan, and mark the crust in order to cut equal slices of pie after the pi is baked. Another important object of the invention is to provide a device of this character having improved means for mounting on a rim of a pie pan for close bearing contact therewith as it travels therearound. A further important object of the invention is to provide a device of this character which enables the operator to control the depth of the crimping indentations as the device travels around the pie pan and at the same time is self-operable to mark the crust to indicate equal slices to be cut from the pie or other baked goods covered by the crust.

In carrying out the invention, the device is constructed with a part which engages the rim of a pie pan or similar container and is capable of substantially frictionless travel therearound. This part includes a rotatable trimming wheel designed to roll upon the upper surface of the rim of a pie pan and sever excess crust material and further includes an under carriage adapted to engage the bottom surface of a rim of a pie pan and cooperate with the periphery of the trimming wheel to hold the latter in close bearing contact with the upper surface of the rim. Associated with the trimming wheel is a crimping wheel which is bodily movable relative to the crimping wheel which is controllable by the operator to vary the depth of its indentations. Features of the invention relate to the mounting of the crimping wheel and the manner of controlling its action. Another feature of the invention relates to the provision for marking the crust material as the device travels around the pie pan for indicating how the pie may be cut after it is baked to produce slices of equal size. A further feature of the invention relates to the handle control for regulating the action of the crimping wheel during the travel of the device around a pie pan and particularly to the provision of spring means opposing the application of manual force for this purpose.

All of the foregoing and still further objects and advantages of the invention will become more fully apparent from a study of the specification, taken in connection with the drawings, wherein:

Fig. 1 is a side view, partly in section, of a device constructed in accordance with this invention and showing the use thereof upon the crust of a pie contained in a conventional pie pan, Fig. 2 is a vertical cross sectional view through the device and pie pan of Fig. 1 taken along line 2—2 thereof, Fig. 3 is a perspective view of one of the members of the crimping wheel assembly in the device of Figs. 1 and 2, Fig. 4 is a top plan view of a device similar to that shown in Fig. 1 but having a modified form of mounting for the crimping wheel and showing the device in the act of traveling around the rim of a conventional pie pan, Fig. 5 is a vertical cross sectional view taken along line 5—5 of a modification to that of Fig. 4, when the device would be in a vertical position, modified in that a winged nut is secured to the outer end of the shaft for endwise adjustment thereof, Fig. 6 is a perspective view of the essential shaft supported parts used in the forms of the invention shown in Figs, 4 5 and 8, with the shafts and wheels removed for clarity thereof, Fig. 7 is a fragmentary sectional view taken in the same plane as Fig. 5 but showing a modified form of adjustment for regulating the depth of the crimping action, Fig. 8 is an end view of a device generally similar to the devices of Figs. 1 and 4 but showing a still further modified form of adjustment for regulating the depth of the crimping action, and Fig. 9 is a detail sectional view of a modified form of mounting for the handle control for regulating the action of the crimping wheel.

Referring to the drawings and particularly to Figs. 1, 2 and 3, the embodiment of the invention illustrated therein includes a trimming wheel generally indicated at 10 having a concave or saucer shaped formation. The peripheral portion of the wheel is relatively thin as shown in Fig. 2 and its edge is preferably tapered as at 12 to form a cutting edge. Centrally disposed within the wheel 10 and preferably forming an integral part thereof is an inwardly projecting circularly shaped boss 14. The boss is of less diameter than the wheel and in use its periphery 16 bears on the upper surface of the rim of a pie pan as shown in Fig. 2 and when rolled therearound causes the cutting edge 12 of the wheel to sever excess crust material overhanging the edge of the pie pan in the manner illustrated at the left of Fig. 4. The wheel 10 is provided with an axial bore 18 through which extends a stub shaft 20, the latter having a head 22 serving as an abutment preventing detachment of the wheel from the outer end of the shaft. The trimming wheel 10 is fixed to the stub shaft to turn with the latter.

A handle is provided for moving the device around the rim of a pan or similar receptacle. The handle comprises in the main a stock or shank 24 which in the normal use of the device extends at an upward inclination as shown in Fig. 1. In assembled position, the forward end of the handle, indicated at 26, extends closely adjacent to but in slightly spaced parallel relation to the inner face of the boss 14 of the trimming wheel as shown in Fig. 2. The forward end of the handle is provided with a hole through which the stub shaft 20 extends.

In use, the periphery 16 of the circular boss 14 bears upon the laterally projecting rim of a pie pan or like container. Conventional pie pans include a bottom portion 28, an upwardly and outwardly flaring side wall 30 and the rim 32 upon which the boss of the trimming wheel bears. The bottom crust of a pie contained in the pie pan is indicated at 34 and, as in conventional practice, the bottom crust extends up the side wall of the pan and prior to the trimming operation laps over the rim 32 in the manner shown at the left of Fig. 4. The top crust of a pie contained within the pan is indicated at 36 and, as in conventional practice, the edge of the top crust overlies the rim of the pan in superimposed relation to the bottom crust 34.

Included in the assembly of parts making up the device are elements which as the device is rolled around the pie pan lift the severed edges 34 and 36 of the crusts and crimps them together in sealing relationship. The resulting action of the elements is evident by a comparison of the left and right hand portions of Fig. 1. Aiding in the accomplishment of these results is a plate 38 which depends downwardly from the forward end of the handle 24 and extends substantially to the level of the rim 32 of the pie pan. The plate which is incorporated in each of the several modifications illustrated in the drawing is best shown in Fig. 6. It is preferably formed out of sheet metal and is provided in the upper end thereof with a hole 40 for receiving the stub shaft 20. In assembled position on the device, the plate is mounted on the shaft 20 on the same side of the handle as the trimming wheel 10, as shown in Figs. 2 and 5. The inner face of the boss 14 is slightly indented and interposed between the upper end of the plate and the boss is a thin annularly shaped member 42 which serves as a washer. When the device is mounted on the rim of a pie pan, the plane of the plate 38 substantially intersects the corner between the side wall 30 and the rim 32 of the pie pan.

The plate 38 is provided with a finger 44 projecting forwardly from the leading edge of the plate. The finger is provided with a quarter twist to give it a flat horizontally extending ledge 46 which in the operating position of the device slidably bears on the rim 32 near the peripheral portion of the wheel 10 performing the crust trimming operation, as shown in dotted outline in Fig. 4. In this position the ledge 46 of the finger extends under the edge of the bottom crust 34 and as the device is moved around the pie pan the ledge raises or upturns the edges of the two crust edges and the quarter twist of the finger curls the crust edges to a substantially vertical position, shown at the right of Fig. 1. The finger cooperates with the trimming wheel 10 and as soon as the wheel has severed excess crust material the finger immediately lifts the cut edges of the crusts to the vertical position shown.

An important feature of the invention is the provision for gripping the device to the rim of the pan. This is accomplished by providing a jog in the plate 38 and bringing the lower portion of the plate in under the rim 32 of the pie pan. The vertical portion of the plate over the rim has its lower edge lying close to but clearing the rim and the inner margin of the lip to function as a retaining wall for holding the severed crust edges in upright position until crimped. Extending laterally from the lower edge of the plate 38 and integrally connected thereto are two spaced apart flat strap portions 48—48 of similar formation clearing the rim and forming a clearance aperture for the wheel. The outer portions of the straps are bent downwardly past the rim and are integrally merged with one another and with an inwardly projecting ledge or shelf portion 50. The shelf 50 extends in under the rim 32, and as shown best in Figs. 1, 2, and 6, may be shaped to carry two spherical rollers or balls 52—52. The balls are retained in cages formed by flanges 54 struck up from the end portions of the shelf 50 and partially enclosing the balls. The balls are supported by their cages in contact with the underside of the rim 32 and provide a substantially frictionless engagement between the shelf 50 and the rim. Preferably the shelf or ledge 50 is preformed with an arch as shown in Fig. 6 for raising the ball carrying end portions above the middle portion. This imparts a springiness to the end portions of the shelf allowing them to flex downwardly.

The relation of the parts to the rim of the pie pan is such that when the device is in mounted position on a pie pan, the ball carrying end portions are flexed downwardly to cause the shelf to assume an approximately flat condition as shown in Fig. 1. The flexible character of the end portions of the shelf enables the plate 38 to be snapped on and off of the rim 32 carrying the balls 52—52 past the rolled under edge of the rim. To facilitate removal of the device from the pan the opposite end portions of the undercarriage shelf 50 may be provided with outwardly extending tongues 55 which curl around the cutting edge of the trimming wheel 10 as best shown in Figs. 4 and 8. The shelf 50 with its roller means forms an undercarriage for the device which cooperates with the lower portion of the periphery of the boss 14 of the wheel 10 to moveably secure the device to the rim of a pie pan and provide relatively free travel therearound.

Carried by the device and located inwardly of the trimming wheel 10 is a crimping wheel. The crimping wheel has the same crimping formation in the several modifications illustrated in the drawing and is indicated in said modifications at 56. The crimping wheel is provided with a series of circularly spaced apart teeth 58 on its periphery which as shown in Figs. 1 and 4 may terminate in relatively blunt rounded extremities. In all the modifications, the crimping wheel 56 is capable of bodily swingable movement relative to the trimming wheel 10 to bring the lower peripheral portion thereof closely adjacent to the lower edge of the plate 38 in the manner shown in Figs. 2 and 5.

In the modification illustrated in Figs. 1 and 2, the crimping wheel is axially bored out to receive a bifurcated extension 60—60 formed on the inner end of the stub shaft 20 and projecting inwardly thereof. A rectangularly shaped block 62 is disposed between the ends of the bifurcated sections 60—60 and is pivotally connected thereto by means of a cross pin 64. Carried by the crimping wheel and projecting radially inwardly from the opposite sides thereof are two screw members 66—66 of similar formation. The crimping wheel is radially bored and internally threaded to receive the screws as is evident in Fig. 2 and the inner extremities of these screws are tapered to provide a pivot mounting on the block 62 and for securing the crimping wheel thereto. The heads 68 of the screws lie below the root diameter of the teeth 58 of the crimping wheel as shown in Fig. 1. In this manner, a universal joint is provided within the plane of the crimping wheel which is connected to the stub shaft 20 and enables the crimping wheel to swing relative thereto and in operating position to assume the inclination shown in Fig. 2 to bring its lower peripheral portion closely adjacent to the bottom edge of the plate 38.

The swinging movement of the crimping wheel 56 is controlled from the handle by means of a finger engaging member 70. This member is wider at its outer end as shown in Fig. 1 and may have a concave depression therein for receiving the thumb of the hand which grasps the handle. The intermediate portion of the finger control member 70 is pivotally connected to the handle 24 for swinging movement around a substantially vertical axis. This may be accomplished as shown in Figs. 1 and 4 by reducing or thinning the width of the finger control member 70 in order to pass it between two closely spaced apart tangs 72 and 74 which project laterally from the inner face of the handle 24 and may form integral parts thereof. The tangs are bridged by a pin 78 which serves as a rocking axis for the finger control member 70.

The inner extremity of the finger control member, indicated at 80, is operatively coupled to the crimping wheel for rocking the same about the universal joint connection to the stub shaft 20 in response to the rocking movement of the finger control. This is accomplished by providing a non-rotatable plate 82 illustrated in Fig. 3 which in mounted position extends parallel to the crimping wheel and against which the crimping wheel bears as it rotates.

The plate 82 is provided with a central aperture 84 as shown in Fig. 3 through which the inner bifurcated end of the stub shaft 20 extends. The upper end of the plate is provided with an outwardly projecting ear 86 which may form a part of the plate as shown in Fig. 3. The ear is provided with an aperture 88 through which the inner extremity of the finger control 70 is loosely fitted.

Spring means is provided for resisting swinging movement of the crimping wheel to the position shown in Fig. 2. Said spring means may be incorporated in the plate 82 in the manner shown in Fig. 3. Struck from the opposite side portions of the plate 82 are two arcuately shaped sections 90—90 of similar formation. In the assembled position of the plate 82, the two curved sections 90—90 bear against the inside face of the handle on opposite sides of the stub shaft 20. These curved sections 90—90 are resilient and react from the handle to exert a force tending to rock the crimping wheel clockwise away from the position shown in Fig. 2, or similar to that shown in Fig. 8. It is thus evident from the control structure described that upon depression of the outer extremity of the finger control it will rock about its axis 78 and cause its inner extremity 80 to swing the crimping wheel in a counter clockwise direction against the resistance of the spring elements 90—90.

In Figs. 4, 5 and 6, a modification of the invention is illustrated in which the supporting and adjusting parts associated with the trimming and crimping wheels differ from that previously described. Parts of this modification which correspond to elements previously described are referred to by the same reference characters, such as the trimming wheel 10, crimping wheel 56, plate 38 and the undercarriage assembly. In Fig. 4 the stub shaft is also similar to that previously described in that it is secured to the trimming wheel. In the modification of Figs. 4, 5 and 6, the trimming wheel 10 is keyed to a shaft 92 by means of a pinched key 94 which interfits with an elongated key slot 96 in the bore of the trimming wheel through which the shaft extends. Similarly as in the previously described embodiment of the invention, the inner end of the shaft 92 is bifurcated to provide spaced apart end sections 98—98 as best shown in Fig. 4. Disposed between these bifurcated end sections is a block 100 similar to the block 62 previously described which is pivotally connected to the end sections 98—98 by pins or screws 102—102.

The crimping wheel 56 is press fitted or otherwise mounted upon a stub shaft 104 for joint rotation therewith. The outer end of the stub shaft is bifurcated to provide spaced apart end sections 106—106 which straddle the block 100 in a 90° relationship to the end sections 98—98 and are pivotally connected to the block by means of pins or screws 108—108. The axes of the two sets of pins or screws 102 and 108 intersect one another in the block 100 and together with the block form a universal joint for coupling the crimping wheel assembly to the shaft 92 of the trimming wheel.

The crimping wheel 56 of the modification of Figs. 4, 5 and 6 is mounted in a carrier composed of an inner plate 110 corresponding in shape and formation to plate 82 previously described and an outer plate 112, the two plates extending in spaced parallel relationship to one another and being connected together at their upper ends by a cross plate 114. The three plates 110, 112 and 114 form a housing into which the crimping wheel 56 is received as shown in Fig. 5. The inner plate 110 is provided with a bottom opening recess 116 into which the stub shaft 104 of the crimping wheel is received when the crimping wheel is assembled. The outer plate 112 is provided with an aperture 118 through which the stub shaft 104 extends in its assembled position, and a head on the shaft abuts the outer plate to hold the housing from axial displacement. The upper end of the inner plate 110 is provided with a laterally projecting apertured ear 120 corresponding in shape and function to the ear 86 previously described and shown in Fig. 3. Similarly as in the plate 82 of Fig. 3, the inner plate 110 is provided with two arcuately formed struck out sections 122—122 which are adapted to flexibly bear against the inside face of the inner end of the handle. The handle 24 is the same in all figures but not described previously for clarity are spaced parallel inturned flanges 124—125 which extend alongside of the arcuately bent spring sections 122—122 to restrict sidewise movement of the latter and the crimping wheel housing with which they are associated.

The swinging movement of the crimping wheel and its carrier is controlled in a manner similar to that previously described by means of a rocking finger member 126. The intermediate portion of this finger control is reduced and flattened to pass between the opposed sections of a pivotal support 128 generally similar to the support 72—74 previously described. The inner extremity 130 of the finger control is outwardly bent as best shown in Fig. 4 and is projected through the aperture of the ear 120 of the crimping wheel carrier. It is evident that upon rocking movement of the finger control 126 that it will swing the carrier and its crimping wheel about a universal joint in the manner described in connection with the embodiment illustrated in Figs. 1 and 2. The swinging movement of the crimping wheel in the direction to bring its lower peripheral portion adjacent to the plate 38 will be resisted by the spring means 122—122 struck out from the inner plate 110 of the wheel housing.

When the upper end of the crimping wheel 56 is swung downwardly as in the two modifications of the invention heretofore described, the lower peripheral portion of the crimping wheel will cooperate with the plate 38 to compress or pinch the raised edges of the pie crusts. If both of the top and bottom edges of the crust layers 34 and 36 are raised and received between the plate and the crimping wheel, the compressive action of these layers on the crust edges will pinch and seal them together in the manner shown at the right of Fig. 1. The toothed periphery of the crimping wheel will form a series of alternate hills and valleys in the raised sealed crust edges as indicated at 132 and 134 respectively. An important feature of the invention is the marking of the pie crusts to indicate where equal slices may be cut from the pie. This is accomplished by altering one or more teeth on the crimping wheel 56 so that a different form of indentation is made in the raised sealed edges of the pie crusts.

As shown in Fig. 1, this result may be obtained by reducing the radial extent of one of the teeth of the crimping wheel such as that indicated at 136. The resulting indentation of this tooth will be shallower than the valleys 134 formed by the balance of the teeth. Such shallow indentation is indicated at 138 in Fig. 1. Depending upon the number of teeth on the crimping wheel one or more of the teeth thereof may be reduced or altered in this fashion to distinguish this indentation from the remaining indentations. As the device is rolled around the pie pan these differently shaped indentations will serve to mark the places where cuts may be made in the pie in order to remove slices of equal size therefrom.

The compressive action of the crimping wheel upon the raised edges of the pie crusts may be varied to suit the purpose of the operator. In Fig. 5, the outer end of the shaft 92 receives an adjustable nut 140 which is capable of varying the distance between the trimming wheel 10 and the crimping wheel 56 to thereby vary the compression exerted by the crimping wheel and the plate 38 on the raised edges of the crusts. As shown in Fig. 5, the outer end of the shaft 92 is externally threaded as at 142 to receive the nut 140. Rotative adjustment of the latter on the shaft will either draw the cross center line of the universal joint assembly toward or away from the trimming wheel assembly depending upon the direction of rotation. The outer face of the nut 140 may be shaped to provide radially projecting ridges 144 to not only facilitate adjustment of the nut but also to impart an ornamental design to the pie crusts. For the latter purpose, the device may be held in the hand and turned to bring the nut 144 on the underside thereof and while in this position the device may be lowered into the dough material of the upper crust 36 to form a star-shaped design therein.

In Fig. 7 there is illustrated an alternative form of adjustment for varying the compressive action between the crimping wheel and the plate 38. The shaft 92 is provided with a reduced extension 146 upon which a hub 148 is journally secured thereto. A screw 150 serves to secure the hub to the extension 146 of the shaft. The hub is externally threaded as at 152 and in threaded engagement therewith is a ring nut 154. The inside face of the ring nut 154 abuts the outer face of the trimming wheel 10 and by virtue of the spaced relationship between the hub 148 and the trimming wheel, rotation of the ring nut will axially displace the shaft 92 relative to the trimming wheel. This will vary the spaced relationship of the trimming wheel assembly to the crimping wheel assembly and alter the spaced relationship of the periphery of the crimping wheel to the adjacent surface of the plate 38.

A modification of the adjustment feature previously described is shown in Fig. 8. In this figure, the hub 156, which corresponds in shape and formation to the hub 148 and is journally secured to the shaft as previously described, is rigidly connected to the handle 24 by means of a curved metallic band 158. In this manner, the hub 156 is held from rotation relative to the handle. The metallic band connection 158 has a degree of resiliency urging the hub 156 toward the plane of the handle. The outer faces of both hubs 148, and 156 may be shaped to have radially projecting ridges with which to impart ornamental designs on the pie crust as previously described for the nut 140. Interposed between the hub 156 and the outer face of the crimping wheel 10 is a cam washer 160. The cam washer is provided with a series of teeth facing toward the hub 156 of different degrees of depression. The inner end 162 of the hub 156 is provided on its inside face with cooperating teeth of different degrees of depression which are adapted to engage the teeth of the cam washer in the manner shown in Fig. 8. The cam washer is held from free rotation on the trimming wheel shaft by the intermeshed teeth previously described and is provided with a handle 164 for rotating it about the axis of the shaft. It is evident that upon rotation of the handle of the cam washer 160 the teeth thereof will be caused to ride past the teeth of the cooperating hub 156 and force the latter outwardly away from the trimming wheel or allow the nut to move inwardly as shown in Fig. 8.

A screw 166, similar to screw 150 previously described, journally secures the hub 156 to the outer end of the trimming wheel shaft. Thus the rotative adjustment of the cam washer 160 will axially displace the shaft and either bring the crimping wheel 56 closer to the plate 38 or space it further apart therefrom. This adjustment will vary the compressive force with which the crimping wheel and the plate pinch the raised edges of the crusts.

A different pivotal mounting for the finger control is illustrated in Figs. 8 and 9. As shown therein, the inner extremity of the handle 24A is provided with a cylindrical stud 168 which serves as a spherical mounting providing rocking movement of the finger. The stud is provided with a spherical convexed end 170 upon which the finger member 172 is seated. Spring means is provided for yieldingly seating the finger control member on the end 170 of the stud. A coil spring 174 is shown for this purpose which encircles the shank portion of a screw 176 which is axially fitted into the outer end of the stud 168. One end of the spring bears upon the finger control member and the other end bears under a washer abutting the head of the screw. The inner end of the finger control indicated at 178 is loosely connected to a crimping wheel carrier similar to that shown in Fig. 6 and including spaced parallel plate members 180 and 182 corresponding to plate members 110 and 112 respectively of the carrier in Fig. 6. The loose connection constitutes a short link 184 pivotally connected to the inner end 178 of the finger control member and to an ear 186 struck out from the plate member 180.

In general, there is provided as a result of this invention, an improved implement which is adapted to releasably grip the rim of a pie pan or similar receptacle and while moving around the rim to trim away the excess crust material of a pie in the pie pan, to raise the cut edges of the pie crust away from the rim of the pie pan and crimpingly seal them together, and to mark the crust for indicating the places where equal slices may be cut from the pie. In addition, the resulting device is capable of axially precision displacing the crimping and trimming wheels to vary the depth of the indentations made by the crimping wheel on the severed edges of the crust layers. A novel finger control is provided for moving the crimping wheel into engagement with the turned-up edges of the pie crusts, and the operator is capable by judicious pressure applied to the finger control to vary the crimping and sealing action and the depth of the indentations 134. The device is easily mounted on and removed from the rim of a pie pan and in operating position will follow the curved contour of the pie pan rim without intentional force being required to keep it thereon.

What I claim is:

1. In a culinary tool, in combination, a first wheel, said wheel having an axial shaft and a cylindrical boss disposed about said shaft adapted to roll on an element, universal coupling means mounting a second wheel to said shaft axially of and in laterally off-set relation to said first wheel to provide for angular movement of said second wheel to a lower position relatively to said first wheel, a plate member carried by the shaft having a finger located in advance of the first wheel in a position tangential to the bottom of said boss, adapted to slidably bear upon the element on which the tool is propelled upturning that which overlies said element into engagement with the second wheel, spring means positioned between said wheels and reacting in opposition to the first means to move the second wheel away from its lower angular position.

2. In a culinary tool, in combination, a first wheel having an axial shaft and a circular boss disposed about said shaft adapted to roll on an element, the wheel having a cutting edge projecting outwardly from one end of the boss designating the outer end of said wheel, a dependent plate journaled on the shaft inwardly of the boss, said plate having a forward portion converging from an upright intermediate portion to a horizontal formation on a plane tangential to the lowermost peripheral surface of the boss and forwardly thereof, universal coupling means mounting a second wheel with rounded teeth on its periphery to the inner end of the shaft in lateral off-set relation to the first wheel, a bottom portion of the dependent plate is of a channel formation with its open side projecting inwardly, the top wall of the channel has an aperture through which the bottom surface of the boss projects, the bottom wall of the channel positioned below the boss and carrying means of vertical resilient engagement to contact the bottom side of the element on which the boss bears, providing a snap-on undercarriage for alignment.

3. In a culinary tool, in combination, a first wheel having an axial shaft and a circular boss disposed about said shaft adapted to roll on an element, the wheel having a cutting edge projecting outwardly from one end of the boss designating the outer end of said wheel, universal coupling means mounting a second wheel with rounded teeth on its periphery to the inner end of the shaft in lateral off-set relation to the first wheel, a handle journaled on the shaft between the wheels having a free end projecting rearwardly, a plate member positioned adjacent the second wheel and having spring means that contact the inner face of the handle, means connected to the plate member and fulcrumed to the handle for manipulation in opposition to the spring means in controling the angular position of the second wheel.

4. In a culinary tool, in combination, a first wheel having an axial shaft and a circular boss disposed about said shaft adapted to roll on an element, the wheel having a cutting edge projecting outwardly from one end of the boss designating the outer end of said wheel, universal coupling means mounting a second wheel with rounded teeth on its periphery to the inner end of the shaft in lateral off-set relation to the first wheel, a handle journaled on the shaft between the wheels having a free end projecting rearwardly, a plate member positioned adjacent the second wheel and having spring means that contact the inner face of the handle, means connected to the plate member and fulcrumed to the handle for manipulation in opposition to the spring means in controling the angular position of the second wheel, a dependent plate journaled on the shaft between the outer side of the handle and the first wheel, said plate having a forward portion converging from an upright intermediate portion to a horizontal formation on a plane tangential to the lowermost peripheral surface of the boss and forwardly thereof, adapted to upturn that which overlies the element on which the boss bears, the intermediate portion terminates short of the bottom of the boss and supports a lower channel portion with its open side projecting inwardly, the top wall of the channel has an aperture through which the bottom surface of the boss projects, the bottom wall of the channel positioned below the boss and carrying means of vertical resilient engagement to contact the bottom side of the element on which the tool is used, thus a tool with a snap-on undercarriage for alignment thereof.

5. In a culinary tool, in combination, a first wheel having an axial shaft and a circular boss disposed about said shaft adapted to roll on an element, the wheel having a cutting edge projecting outwardly from one end of the boss designating the outer end of said wheel, a dependent plate journaled on the shaft inwardly of the boss, said plate having a forward portion converging from an upright intermediate portion to a horizontal formation on a plane tangential to the lowermost peripheral surface of the boss and forwardly thereof, universal coupling means mounting a second axial shaft to the inner end of the first shaft in lateral off-set relation to the first wheel, the second shaft having a second wheel mounted thereon and the periphery of said wheel having rounded teeth, a bottom portion of the dependent plate is of a channel formation with its open side projecting inwardly, the top wall of the channel has an aperture through which the bottom surface of the boss projects, the bottom wall of the channel positioned below the boss and carrying means of vertical resilient engagement to contact the bottom side of the element on which the boss bears, providing a snap-on undercarriage for alignment.

6. In a culinary tool, in combination, a first wheel having an axial shaft and a circular boss disposed about said shaft adapted to roll on an element, the wheel having a cutting edge projecting outwardly from one end of the boss designating the outer end of said wheel, universal coupling means mounting a second axial shaft to the inner end of the first shaft in lateral off-set relation to the first wheel, the second shaft having a second wheel mounted thereon and the periphery of said wheel having rounded teeth, a handle journaled on the shaft between the wheels having a free end projecting rearwardly, a plate member positioned adjacent the second wheel and having spring means that contact the inner face of the handle, means connected to the plate member and fulcrumed to the handle for manipulation in opposition to the spring means in controlling the angular position of the second wheel.

7. In a culinary tool, in combination, a first wheel having an axial shaft and a circular boss disposed about said shaft adapted to roll on an element, the wheel having a cutting edge projecting outwardly from one end of the boss designating the outer end of said wheel, universal coupling means mounting a second axial shaft to the inner end of the first shaft in lateral off-set relation to the first wheel, the second shaft having a second wheel mounted thereon and the periphery of said wheel having rounded teeth, a handle journaled on the shaft between the wheels having a free end projecting rearwardly, a plate member positioned adjacent the second wheel and having spring means that contact the inner face of the handle, means connected to the plate member and fulcrumed to the handle for manipulation in opposition to the spring means in controlling the angular position of the second wheel, a dependent plate journaled on the shaft between the outer side of the handle and the first wheel, said plate having a forward portion converging from an upright intermediate portion to a horizontal formation on a plane tangential to the lowermost peripheral surface of the boss and forwardly thereof, adapted to upturn that which overlies the element on which the boss bears, the intermediate portion terminates short of the bottom of the boss and supports a lower channel portion with its open side projecting inwardly, the top wall of the channel has an aperture through which the bottom surface of the boss projects, the bottom wall of the channel positioned below the boss and carrying means of vertical resilient engagement to contact the bottom side of the element on which the tool is used, thus a tool with a snap-on undercarriage for alignment thereof.

References Cited in the file of this patent

UNITED STATES PATENTS

| Number | Name | Date |
|---|---|---|
| 37,761 | Marshall | Feb. 27, 1863 |
| 57,990 | Stephen et al. | Sept. 11, 1866 |
| 748,997 | Stange | Jan. 5, 1904 |
| 1,527,671 | Condyles | Feb. 24, 1925 |
| 2,369,452 | Gamache | Feb. 13, 1945 |